United States Patent
Hirai

(10) Patent No.: US 7,433,424 B1
(45) Date of Patent: Oct. 7, 2008

(54) SIGNAL RECEIVING APPARATUS AND METHOD AND RECORDING MEDIUM

(75) Inventor: Jun Hirai, Tokyo (JP)

(73) Assignee: Sony Corporation, Tokyo (JP)

( * ) Notice: Subject to any disclaimer, the term of this patent is extended or adjusted under 35 U.S.C. 154(b) by 817 days.

(21) Appl. No.: 09/670,869

(22) Filed: Sep. 27, 2000

(30) Foreign Application Priority Data

Sep. 28, 1999 (JP) ................... 11-274228

(51) Int. Cl.
*H03K 9/00* (2006.01)
*H04L 27/00* (2006.01)

(52) U.S. Cl. .............. 375/316; 348/441; 348/469; 725/49; 725/68

(58) Field of Classification Search .......... 348/441, 348/725, 555, 569, 554, 731, 732, 553, 584, 348/726, 564, 512, 469; 725/131, 48, 49, 725/68; 375/316, 260, 240, 219, 240.16, 375/240.26, 240.21, 240.12, 240.25; 370/389, 370/473, 503; 380/227; 386/46, 83
See application file for complete search history.

(56) References Cited

U.S. PATENT DOCUMENTS

| | | | |
|---|---|---|---|
| 5,649,318 A | | 7/1997 | Lusignan |
| 5,799,081 A * | | 8/1998 | Kim et al. .................... 380/203 |
| 5,844,623 A | | 12/1998 | Iwamura |
| 5,987,126 A * | | 11/1999 | Okuyama et al. ........... 380/203 |
| 5,991,500 A * | | 11/1999 | Kanota et al. ................. 386/94 |
| 6,118,486 A * | | 9/2000 | Reitmeier ................... 348/441 |
| 6,124,893 A * | | 9/2000 | Stapleton .................... 348/441 |
| 6,137,539 A * | | 10/2000 | Lownes et al. .............. 348/569 |
| 6,204,884 B1 * | | 3/2001 | Lee ............................. 348/555 |
| 6,219,422 B1 * | | 4/2001 | Sato ........................... 380/240 |
| 6,259,694 B1 * | | 7/2001 | Sato et al. .................... 370/389 |
| 6,305,021 B1 * | | 10/2001 | Kim ............................ 725/131 |
| 6,317,168 B1 * | | 11/2001 | Seo ............................. 348/725 |
| 6,323,909 B1 * | | 11/2001 | Michener et al. ............ 348/512 |
| 6,366,731 B1 * | | 4/2002 | Na et al. ...................... 386/83 |
| 6,501,510 B1 * | | 12/2002 | Moon .......................... 348/553 |
| 6,769,128 B1 * | | 7/2004 | Knee et al. .................... 725/43 |

FOREIGN PATENT DOCUMENTS

| | | |
|---|---|---|
| EP | 0 975 161 | 1/2000 |
| EP | 0 993 183 | 4/2000 |
| WO | WO 98 41012 | 9/1998 |
| WO | WO 98 44731 | 10/1998 |

* cited by examiner

*Primary Examiner*—Ted Wang
(74) *Attorney, Agent, or Firm*—Frommer Lawrence & Haug LLP; William S. Frommer

(57) ABSTRACT

The present invention relates to signal receiving apparatus and method for efficiently transmitting a digital satellite broadcast signal received, and recording medium. A DSS broadcast signal from an antenna is subjected to station selection in a front end circuit, the scramble thereof is released in a descramble circuit, and further it is judged whether the broadcast signal concerned is an SD broadcast signal or HD broadcast signal. The SD signal is decoded in an MPEG decode circuit, converted to an NTSC signal in an NTSC encode circuit, and then output from a video cable. The HD signal is rearranged to a structure conformed with the ATSC system in a multiplexing editing circuit, encrypted in an encryption circuit and then output from an IEEE1394 interface.

10 Claims, 4 Drawing Sheets

SIGNAL RECEIVING APPARATUS AND METHOD AND RECORDING MEDIUM

BACKGROUND OF THE INVENTION

1. Field of the Invention

The present invention relates to signal receiving apparatus and method and a recording medium, and particularly to signal receiving apparatus and method and a recording medium which are suitably used when digital satellite broadcast signals are received and supplied to a television receiver.

2. Description of the Related Art

A digital interface defined in IEEE1394 (hereinafter merely referred to as IEEE1394 interface) is equipped to some personal computers or digital video cameras. By connecting plural electronic devices each having the IEEE1394 interface to one another through an IEEE1394 bus, digital data can be transmitted between the electronic devices at high speed, and the operations thereof can be mutually controlled. In the future, the IEEE1394 interface is expected to be equipped to electronic devices other than the personal computer and the digital video camera (for example, a set top box for a digital satellite broadcast, a television receiver, etc.).

Here, a digital satellite broadcast executed in U.S. (hereinafter referred to as DSS (Direct Satellite System)) will be described. In DSS, the broadcast is carried out in SD (Standard Definition) broadcast which provides the same level resolution as the current ground broadcasts (NTSC (National Television Standard Committee) system) and in HD (High Definition) broadcast which provides a higher resolution than the SD broadcast, and both the broadcast signals are transmitted as digital data.

Accordingly, if an IEEE1394 interface is provided to the set top box for DSS to transmit a received digital broadcast signal through the IEEE1394 bus to another electronic equipment (for example, television receiver), the broadcast signal can be prevented from being deteriorated and the transmission efficiency is enhanced.

Both the SD broadcast signal and the HD broadcast signal for DSS are digital data, however, they are different in data structure (for example, packet size, etc.). For example, the packet size is different, or a transmission method is provided for the HD broadcast signal, whereas no transmission method is provided for the SD broadcast signal in the IEEE 1394. Further, the HD broadcast signal is conformed with the next-generation television broadcast system (ATSC (Advanced Television Standard Committee) system, the digital ground broadcast) in U.S.

Accordingly, there is such a problem that it is easy to transmit the HD broadcast signal received by the set top box to the IEEE1394 bus, however, it is difficult to transmit the SD broadcast signal through the IEEE1394 bus under the state that the SD broadcast signal is kept as digital data.

Further, when a broadcast signal received by the set top box corresponds to a movie or the like, and the copyright thereof is protected, it must be prevented from being unjustly recorded at a transmission destination.

SUMMARY OF THE INVENTION

The present invention has an object to enable digital satellite broadcast signals received to be efficiently transmitted by switching a transmission path in connection with the type of the received broadcast signals.

A signal receiving apparatus according to the present invention comprises: signal receiving means for receiving a digital satellite broadcasting signal; judging means for judging whether the digital satellite broadcasting signal received by the signal receiving means is the first broadcast signal or the second broadcast signal; generating means for generating an analog signal with the first broadcast signal in accordance with the judgment result of the judging means; first output means for outputting the analog signal generated in the generating means from an analog interface; conversion means for converting the data structure of the second broadcast signal in accordance with the judgment result of the judging means to generate a third broadcast signal; and second output means for outputting the third broadcast signal generated in the conversion means from a digital interface.

The signal receiving apparatus according to the present invention further comprises addition means for adding the analog signal with a signal for suppressing copy of the analog signal, and encrypting means for encrypting the third broadcast signal.

A signal receiving method according to the present invention comprises: a signal receiving step of receiving a digital satellite broadcasting signal; a judging step of judging whether the digital satellite broadcasting signal received in the signal receiving step is the first broadcast signal or the second broadcast signal; a generation step of generating an analog signal in accordance with the judgment result in the processing of the judging step by using the first broadcast signal; a first output step of outputting from an analog interface the analog signal generated through the processing of the generating step; a conversion step of converting the data structure of the second broadcast signal in accordance with the judgment result in the processing of said judging step to generate a third broadcast signal; and a second output step of outputting from a digital interface the third broadcast signal generated in the processing of the conversion step.

A program of a recording medium according to the present invention comprises: a judging step of judging whether the digital satellite broadcasting signal thus received is the first broadcast signal or the second broadcast signal; a generating step of generating an analog signal in accordance with the judgment result of the processing of the judging step by using the first broadcast signal; a first output step of outputting from an analog interface the analog signal generated in the processing of the generating step; a conversion step of converting the data structure of the second broadcast signal in accordance with the judgment result in the processing of said judging step to generate a third broadcast signal; and a second output step of outputting from a digital interface the third broadcast signal generated in the processing of the conversion step.

A signal receiving apparatus according to the present invention comprises: first input means for inputting an analog signal which is a base band signal of a first broadcast signal; second input means for inputting a digital signal which is a second broadcast signal; decoding means for decoding the digital signal to generate a base band signal of the second broadcast signal; selection means for selecting one of the base band signal of the first broadcast signal input from the first input means and the base band signal of the second broadcast signal generated by the decoding means; and display control means for controlling an image display corresponding to the base band signal of the first or second broadcast signal selected by the selection means.

The signal receiving apparatus according to the present invention, further comprises signal receiving means for receiving a third broadcast signal, wherein the decoding means also decodes the third broadcast signal to generate a base band signal of the third broadcast signal.

A signal receiving method according to the present invention comprises: a first input step of inputting an analog signal which is a base band signal of a first broadcast signal; a second input step of inputting a digital signal which is a second broadcast signal; a decoding step of decoding the digital signal to generate a base band signal of the second broadcast signal; a selection step of selecting one of the base band signal of the first broadcast signal input through the processing of the first input step and the base band signal of the second broadcast signal generated in the processing of the decoding step; and a display control step of controlling an image display corresponding to the base band signal of the first or second broadcast signal selected in the processing of the selection step.

A program of a recording medium according to the present invention comprises: a first input step of inputting an analog signal which is a base band signal of a first broadcast signal; a second input step of inputting a digital signal which is a second broadcast signal; a decoding step of decoding the digital signal to generate a base band signal of the second broadcast signal; a selecting step of selecting one of the base band signal of the first broadcast signal input through the processing of the first input step and the base band signal of the second broadcast signal generated in the processing of the decoding step; and a display control step of controlling an image display corresponding to the base band signal of the first or second broadcast signal selected in the processing of the selecting step.

In the signal receiving apparatus, the signal receiving method and the program of the recording medium according to the present invention, the digital satellite broadcast signal is received, and it is judged whether the digital satellite broadcast signal received is the first broadcast signal or the second broadcast signal. In accordance with the judgment result, the analog signal is generated by using the first broadcast signal, and the analog signal thus generated is output from the analog interface. Further, in accordance with the judgment result, the data structure of the second broadcast signal is converted to generate the third broadcast signal, and the third broadcast signal thus generated is output from the digital interface. Accordingly, the digital satellite broadcast signal thus received can be efficiently transmitted.

In the signal receiving apparatus, the signal receiving method and the program of the recording medium according to the present invention, the analog signal which is the base band signal of the first broadcast signal is input, and the digital signal which is the second broadcast signal is input. Further, the base band signal of the second broadcast signal is generated by decoding the input digital signal, and one of the base band signal of the first broadcast signal thus input and the base band signal of the second broadcast signal thus generated is selected to control the image display corresponding to the base band signal of the first or second broadcast signal thus selected. Accordingly, the digital satellite broadcast signal thus efficiently transmitted can be displayed.

DETAILED DESCRIPTION OF THE PREFERRED EMBODIMENTS

Preferred embodiments according to the present invention will be described hereunder with reference to the accompanying drawings.

Figure 1:
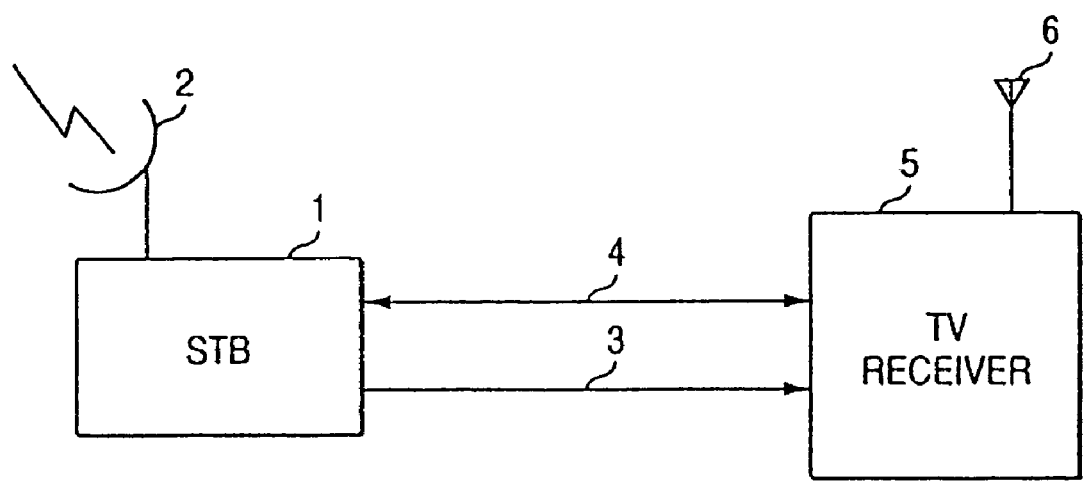
FIG. 1 is a block diagram showing an example of the construction of a television broadcast signal receiving system to which the present invention is applied.

The construction of a television broadcast signal receiving system to which the present invention is applied will be described with reference to FIGS. 1 to 3. A set top box (STB) 1 is connected to a television receiver 5 through a video cable 3 and an IEEE1394 cable 4. A broadcast signal corresponding to a station selection by a user is extracted from a DSS broadcast signal (SD broadcast signal and HD broadcast signal) input from an antenna 2, and subjected to predetermined processing in connection with the type of the broadcast signal concerned (SD broadcast signal or HD broadcast signal). Thereafter, it is output to the television (TV) receiver 5 through the video cable 3 or IEEE1394 cable 4.

Figure 2:
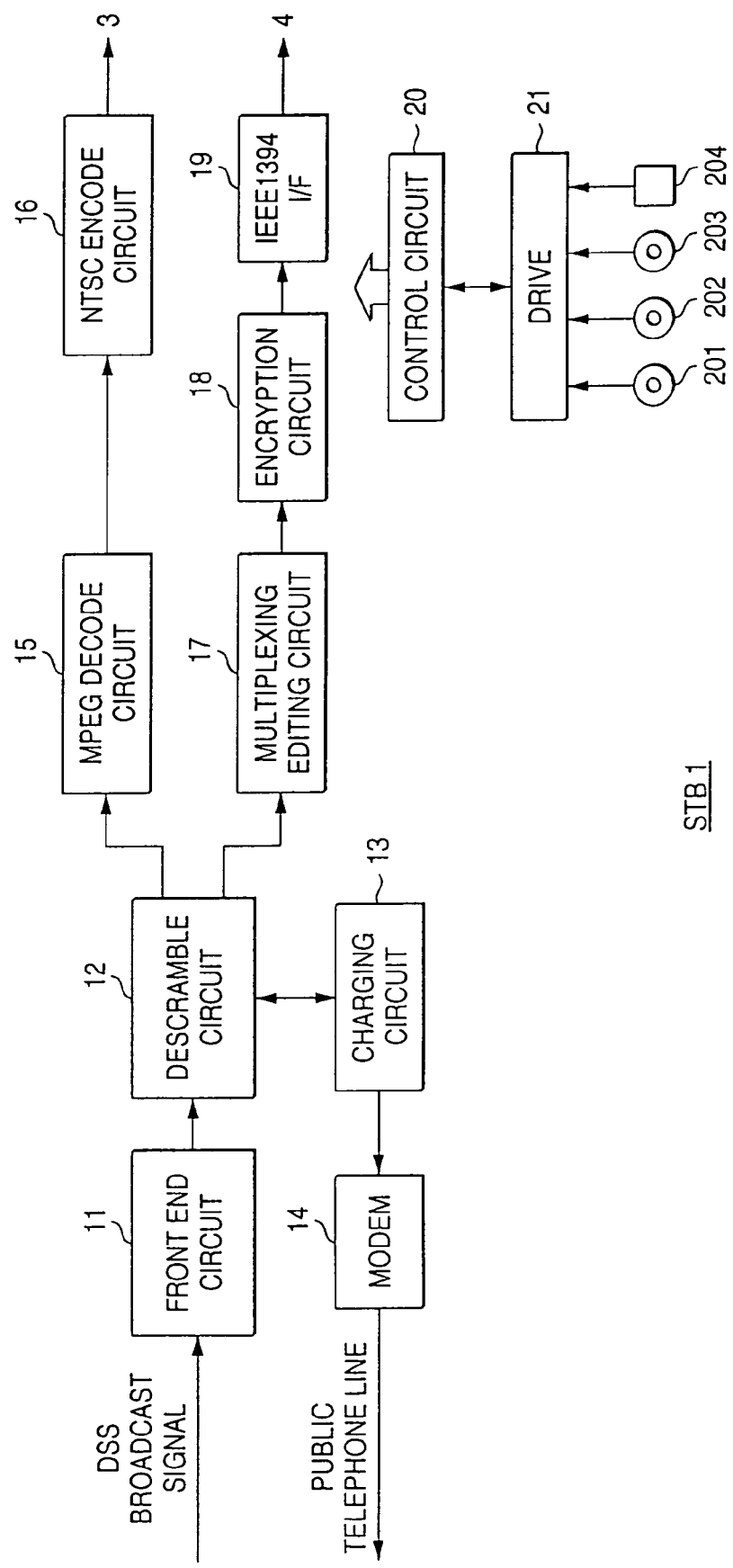
FIG. 2 is a block diagram showing an example of the detailed construction of a set top box 1 of FIG. 1.

FIG. 2 shows an example of the detailed construction of the set top box 1. A front end circuit 11 extracts the broadcast signal corresponding to the station selection of the user from the DSS broadcast signal input from the antenna 2, and outputs it to a descramble circuit 12. When the broadcast signal input from the front end circuit 11 is scrambled, the descramble circuit 12 releases the scrambling by using a decoding key supplied from a charging circuit 13. The descramble circuit 12 outputs the descrambled broadcast signal to an MPEG decode circuit 15 when the broadcast signal concerned is the SD broadcast signal, or to a multiplexing editing circuit 17 when the broadcast signal concerned is the HD broadcast signal.

In accordance with a watching contract style of a user, the charging circuit 13 supplies the descramble circuit 12 with the decoding key used for scramble release. The charging circuit 13 also stores user's information (for example, a watching record of pay per view programs, etc.), and the audience information thus stored is periodically notified to a broadcast station side through a modem 14 and a public telephone line. The charging circuit 13 may be designed so as to supply no decoding key to the descramble circuit 12 in accordance with the signal transmitted from the broadcast station side due to non-payment of watching charge or the like.

The MPEG decode circuit 15 subjects the SD broadcast signal (MPEG-encoded) from the descramble circuit 12 to MPEG decode, and outputs the base band signal thus obtained to an NTSC encode circuit 16. The NTSC encode circuit 16 converts the base band signal input from the MPEG decode circuit 15 to an analog NTSC signal (composite signal, Y/C separation signal, component signal or the like), and outputs it to the television receiver 5 through the video cable 3 serving as an analog interface. When the broadcast signal is a pay per view or the like and it is prohibited from being copied, the NTSC encode circuit 16 inserts an AGC (Automatic Gain Control) pulse into a V blank section of the NTSC signal. The AGC pulse is a signal for disturbing AGC processing which acts on a video cassette recorder of VHS system (disturbing normal recording).

The multiplexing editing circuit 17 rearranges the timestamp and the packet length of a transport stream of the HD broadcast signal (which is MPEG-encoded) from the descramble circuit 12 into the structure of a transport stream define in IEEE1394 (the structure conformed with the ATSC system), and then outputs it to an encryption circuit 18. When the broadcast signal concerned is a pay per view or the like and it is prohibited from being copied, the encryption circuit 18 encrypts the transport stream from the multiplexing editing circuit 17 and outputs it to an IEEE1394 interface (I/F) 19. Until this processing, the signals are handled as logical signals. The IEEE1394 interface 19 converts the signal input from the encryption circuit 18 so that the signal is suitable to be transmitted to the IEEE1394 cable 4, and then outputs it to the television receiver 5 through the IEEE1394 cable 4.

A controller 20 controls a drive 21 to reads out a control program recorded in a magnetic disc 201, an optical disc 202, a magnetooptical disc 203 or a semiconductor memory 204, and controls each circuit of the set top box 1 on the basis of the control program thus read out and a command input from a user or the like.

Returning to FIG. 1, the television receiver 5 switches and displays the image corresponding to the ATSC broadcast signal input from the antenna 6 or the image corresponding to the DSS broadcast signal input from the set top box 1 in accordance with the selection of the user.

Figure 3:
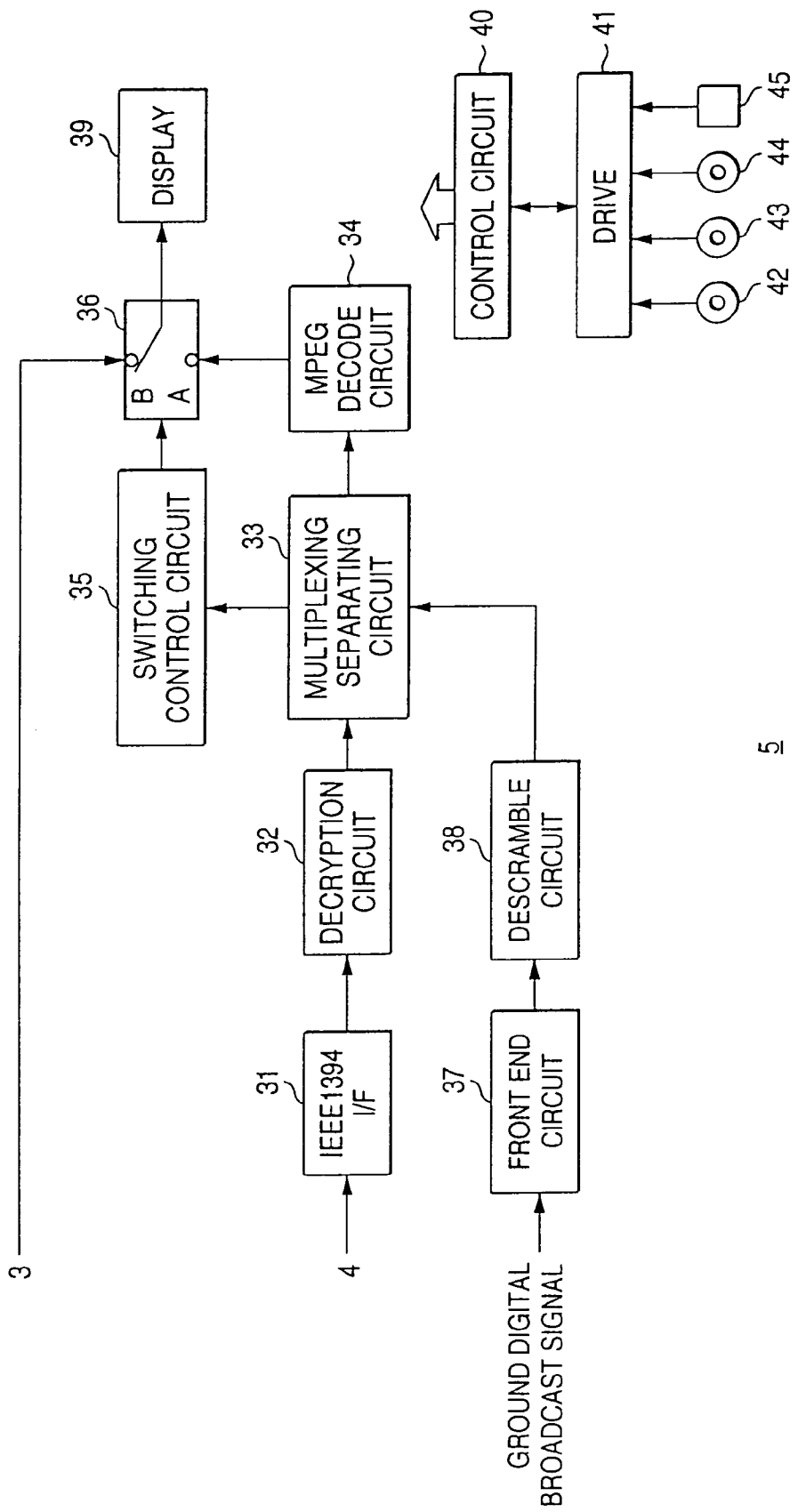
FIG. 3 is a block diagram showing an example of the detailed construction of a television receiver 5 of FIG. 1.

FIG. 3 shows an example of the detailed construction of the television receiver 5. In the television receiver 5, the NTSC signal converted from the SD broadcast signal from the set top box 1 is input to a terminal B of a switch 36 through the video cable 3. The transport stream converted from the HD broadcast signal from the set top box 1 is input to the IEEE1394 interface 31 through the IEEE1394 cable 4. The ATSC broadcast signal from the antenna 6 (see FIG. 1) is input to a front end circuit 37.

The IEEE1394 interface 31 converts to logical level a transport stream which is input through the IEEE1394 cable 4 and converted from the HD broadcast signal, and then outputs it to a decryption circuit 32. The decryption circuit 32 subjects the transport stream from the IEEE1394 interface 31 to the decoding operation corresponding to the encryption which is carried out in the encryption circuit 18 of the set top box 1 and then outputs it to a multiplexing separating circuit 33.

The multiplexing separating circuit 33 separates the transport stream from the decryption circuit 32 or the transport stream from the descramble circuit 38 into a control signal and a video signal (which is MPEG-encoded), and outputs the control signal to a switching control circuit 35 while outputting the video signal to an MPEG decode circuit 34. The MPEG decode circuit 34 MPEG-decodes the video signal from the multiplexing separating circuit 33, and outputs the base band signal thus obtained to the terminal A of a switch 36.

The switching control circuit 35 controls the switching operation of the switch 36 in accordance with a user's selecting operation or a control signal from the multiplexing separating circuit 33. The switch 36 switches the output to the terminal A side or the terminal B side under the control of the switching control circuit 35, and outputs the video signal input from the upper stage to a display 39.

The front end circuit 37 extracts the transport stream corresponding to the user's station selection from the ATSC broadcast signal input from the antenna 6 and outputs it to the descramble circuit 38. The descramble circuit 38 releases the scramble conducted on the transport stream from the front end circuit 37 and outputs the descrambled transport stream to the multiplexing separating circuit 33.

The display 39 displays the video signal input from the switch 36. The audio signal corresponding to the video signal is processed like the video signal in each circuit to output sounds from a speaker (not shown).

The control circuit 40 controls the drive 41 to read out a control program stored in a magnetic disc 42, an optical disc 43, a magnetooptical disc 44 or a semiconductor memory 45, and controls each circuit of the television receiver 5 on the basis of the control program thus read out and a command input from a user or the like.

Figure 4:
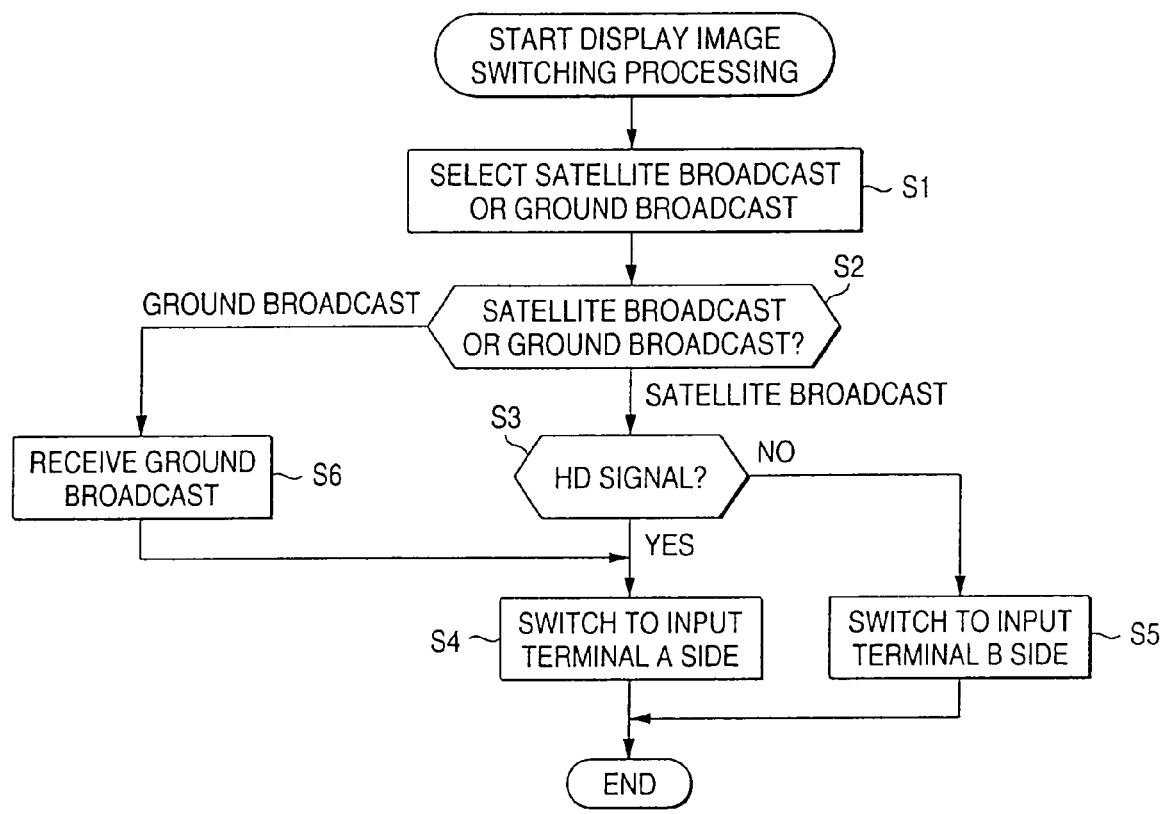
FIG. 4 is a flowchart showing the operation of the television broadcast signal receiving system to which the present invention is applied.

Next, the operation of the television broadcast signal receiving system will be described with reference to the flow-chart of FIG. 4. In step S1, a broadcast (digital satellite broadcast (DSS broadcast) or a digital ground wave broadcast (ATSC broadcast)) watched by a user is selected. In step S2, the user operates the television broadcast signal receiving system in accordance with the step S1. That is, when the watching of the digital satellite broadcast is selected, the set top box 1 and the television receiver 5 are powered on and the station selection is carried out on the set top box 1. The processing goes to step S3.

In step S3, the broadcast signal corresponding to the station selection of the user is extracted from the DSS broadcast signal input from the antenna 2 in the front end circuit 11 of the set top box 1, the scramble conducted on the broadcast signal is released in the descramble circuit 12, and it is judged whether the broadcast signal concerned is an SD broadcast signal or an HD broadcast signal.

If it is judged that the broadcast signal concerned is the HD broadcast signal, the HD broadcast signal is rearranged to the structure of the transport stream defined in the IEEE1394 (the structure conformed with the ATSC system) in the multiplexing editing circuit 17, suitably encrypted in the encryption circuit 18, and then output from the IEEE1394 interface 19 through the IEEE1394 cable 4 to the television receiver 5. In the television receiver 5, it is converted to the logical level in the IEEE1394 interface 31, the encryption thereof is decoded in the decryption circuit 32, it is separated into a control signal and a video signal in the multiplexing separation circuit 33 and then it is MPEG-decoded in the MPEG decode circuit 34. In step S4, the switch 36 is switched to the terminal A side and images of the HD broadcast are displayed on the display 39.

Conversely, if it is judged in step S3 that the broadcast signal concerned is an SD broadcast signal, the SD broadcast signal is output to the MPEG decode circuit 15 to be MPEG-decoded, and converted to an NTSC signal in the NTSC encode circuit 16. Further, an AGC pulse is suitably inserted into the MPEG-decoded signal, and it is output through the video cable 3 to the television receiver 5. In the television receiver 5, in step S5 the switch 36 is switched to the terminal B side to display the images corresponding to the SD broadcast on the display 29.

When the watching of the digital ground wave broadcast is selected by the user in step S1, in step S2 the user powers on the television receiver 5 to select a station. The processing goes to step S6. In step S6, the transport stream corresponding to the station selection of the user is extracted from the ATSC broadcast signal input from the antenna 6 in the front end circuit 37 of the television receiver 5, the scramble thereof is released in the descramble circuit 38, it is separated into a control signal and a video signal in the multiplexing separating circuit 33, and then it is subjected to MPEG decoding in the MPEG decode circuit 34. Thereafter, the processing goes to step S4, and the switch 26 is switched to the terminal A side to display the images of the ground digital broadcast on the display 29.

As described above, according to this embodiment, both the analog NTSC signal output from the set top box 1 through the video cable 3 and the digital signal (the transport stream conformed with the ATSC system) output through the IEEE1394 cable 4 can be subjected to the processing of preventing the broadcast signal from being unjustly copied.

Further, according to this embodiment, it is unnecessary to provide plural circuits of performing the same processing by switching the flow of the signal in accordance with the type of a broadcast signal to be received, so that the circuit scale as a system can be reduced and the producing cost can be reduced.

The series of processing as described above can be executed by a hardware, and also it can be executed by using software. When the series of processing is carried out by the software, a program constituting the software is installed from a recording medium into a computer equipped to a special-purpose hardware or a general-purpose personal computer which can execute various functions by installing various programs.

As shown in FIG. 2 or FIG. 3, the recording medium is supplied not only in the form of a package media formed of a magnetic disc 22, 42 (containing floppy disk), an optical disc 23, 43 (containing CD-ROM (Compact Disc-Read Only Memory)), DVD (Digital Versatile Disc)), a magnetooptical disc 24, 44 (containing MD (Mini Disc)), a semiconductor memory 25, 45 or the like in which a program is recorded to be supplied to users and which is distributed to the users separately from computers, but also in the form of a hard disc contained in ROM or storage unit which is supplied to the users while it is installed in a computer in advance and in which the program is recorded.

In this specification, the steps describing the program recorded in the recording medium contain not only the processing which is executed time-sequentially according to the order described, but also the processing which is not necessarily executed time-sequentially, but may be executed in parallel or individually.

Further, in this specification, the system represents the overall apparatus constructed by plural devices.

What is claimed is:

1. A signal receiving apparatus for receiving a digital satellite broadcasting signal containing a scrambled first broadcast signal in a first format or a scrambled second broadcast signal in a second format, said second format having a transport stream exhibiting a data structure including a timestamp and a transport stream packet length, said apparatus comprising:

signal receiving means for receiving said digital satellite broadcasting signal;

extracting means for extracting said scrambled first broadcast signal or said scrambled second broadcast signal from said digital satellite broadcasting signal;

storage means for storing a user's information representing authorization of the user to access the digital satellite broadcasting signal;

transmitting means for transmitting the user information from the storage means to a broadcast station;

descrambling means for descrambling said scrambled first broadcast signal or said scrambled second broadcast signal extracted by said extracting means if said user information represents authorization to access said digital satellite broadcasting signal;

judging means for judging whether said digital satellite broadcasting signal received by said signal receiving means is in the first broadcast signal format or in the second broadcast signal format;

generating means for generating an analog signal in accordance with the descrambled first broadcast signal and for adding to the analog signal a signal for suppressing copying of the analog signal if it is determined by the judging means that the digital broadcast signal satellite is in said first format;

first output means for outputting from an analog interface the analog signal generated in said generating means as the digital satellite output signal when said judging means judges that said received digital satellite broadcasting signal is in said first format;

conversion means for converting the data structure of the descrambled second broadcast signal by rearranging said timestamp and said packet length of said transport stream of the second broadcast signal when it is determined by the judging means that the digital satellite broadcast signal is in said second format to generate a third broadcast signal; and second output means for outputting from a digital interface as the digital satellite output signal the third broadcast signal generated in said conversion means when said judging means judges that said received digital satellite broadcasting signal is in said second format.

2. The signal receiving apparatus as claimed in 1, wherein the digital satellite broadcasting signal is DSS (Direct Satellite System) broadcast signal, the first broadcast signal is an SD (Standard Definition) broadcast signal and the second broadcast signal is an HD (High Definition) broadcast signal.

3. The signal receiving apparatus as claimed in claim 1, wherein said digital interface is IEEE1394 interface.

4. The signal receiving apparatus as claimed in claim 1, further comprising encrypting means for encrypting the third broadcast signal.

5. A signal receiving method for a signal receiving apparatus for receiving a digital satellite broadcasting signal containing a scrambled first broadcast signal in a first format or a scrambled second broadcast signal in a second format, said second format having a transport stream exhibiting a data structure including a timestamp and a transport stream packet length, said method comprising the steps of:

receiving the digital satellite broadcasting signal;

extracting said scrambled first broadcast signal or said scrambled second broadcast signal from said digital satellite broadcasting signal;

storing a user's information representing authorization of the user to access the digital satellite broadcasting signal;

transmitting the user information from the storage means to a broadcast station;

descrambling said extracted scrambled first broadcast signal or said extracted scrambled second broadcast signal if said user information represents authorization to access said digital satellite broadcasting signal;

judging whether the received digital satellite broadcasting signal is in the first broadcast signal format or in the second broadcast signal format;

generating an analog signal and adding thereto a signal for suppressing copying thereof in accordance with the descrambled first broadcast signal when it is determined that the digital satellite broadcast signal is in the first broadcast signal format;

outputting from an analog interface the generated analog signal as the digital satellite output signal when said judging means judges that said received digital satellite broadcasting signal is in said first format;

converting the data structure of the descrambled second broadcast signal by rearranging said timestamp and said packet length of said transport stream of the second broadcast signal if it is determined that the digital satellite broadcast signal is in said second format to generate a third broadcast signal; and outputting from a digital interface as the digital satellite output signal the third broadcast signal when it is determined that said received digital satellite broadcasting signal is in said second format.

6. The signal receiving method as claimed in claim 5, wherein the digital satellite broadcast signal is a DSS (Direct Satellite System) broadcast signal, the first broadcast signal is an SD (Standard Definition) broadcast signal and the second broadcast signal is an HD (High Definition) broadcast signal.

7. The signal receiving method as claimed in claim 5, wherein said digital interface is an IEEE1394 interface.

8. The signal receiving method as claimed in claim 5, further comprising an encrypting step of encrypting the third broadcast signal.

9. A computer-readable recording medium recorded with a program which is readable by a computer and serves to process a received digital satellite broadcasting signal which contains a scrambled first broadcast signal in a first format or a scrambled second broadcast signal in a second format, said second format having a transport stream exhibiting a data structure including a timestamp and a transport stream packet length, the program controlling the performance of a method comprising the steps of:

extracting said scrambled first broadcast signal or said scrambled second broadcast signal from said digital satellite broadcasting signal;

storing a user's information representing authorization of the user to access the digital satellite broadcasting signal;

transmitting the user information from the storage means to a broadcast station;

descrambling said extracted scrambled first broadcast signal or said extracted scrambled second broadcast signal if said user information represents authorization to access said digital satellite broadcasting signal;

judging whether the received digital satellite broadcasting signal is in the first format or in the second format;

generating an analog signal in accordance with the descrambled first broadcast signal when it is determined that the digital satellite broadcast signal is in the first broadcast signal format;

adding to the analog signal a signal for preventing the analog signal from being copied;

outputting from an analog interface the generated analog signal as the digital satellite output signal when said judging means judges that said received digital satellite broadcasting signal is in said first format;

converting the data structure of the descrambled second broadcast signal by rearranging said timestamp and said packet length of said transport stream of the second broadcast signal if it is determined that the digital satellite broadcast signal is in said second format to generate a third broadcast signal; and outputting from a digital interface as the digital satellite output signal the third broadcast signal when it is determined that said received digital satellite broadcasting signal is in said second format.

10. The computer-readable recording medium as claimed in claim 9, further comprising an encrypting step of encrypting the third broadcast signal.

* * * * *